(12) United States Patent
Ameigeiras et al.

(10) Patent No.: US 7,225,266 B2
(45) Date of Patent: May 29, 2007

(54) ADAPTIVE DELAYED ACK SWITCHING FOR TCP APPLICATIONS

(75) Inventors: Pablo Ameigeiras, Aalborg (DK); Eero Sillasto, Helsinki (FI); Jeroen Wigard, Aalborg (DK)

(73) Assignee: Nokia Corporation, Espoo (FI)

( * ) Notice: Subject to any disclaimer, the term of this patent is extended or adjusted under 35 U.S.C. 154(b) by 844 days.

(21) Appl. No.: 10/323,993

(22) Filed: Dec. 20, 2002

(65) Prior Publication Data

US 2004/0122969 A1    Jun. 24, 2004

(51) Int. Cl.
*G06F 15/16* (2006.01)
(52) U.S. Cl. .................................... 709/235; 370/237
(58) Field of Classification Search ........ 709/231–241, 709/224, 227–228; 370/237–238.1, 229–235; 714/746
See application file for complete search history.

(56) References Cited

U.S. PATENT DOCUMENTS

| | | | |
|---|---|---|---|
| 6,118,765 A * | 9/2000 | Phillips | 370/235 |
| 6,215,769 B1 * | 4/2001 | Ghani et al. | 370/230 |
| 6,215,772 B1 * | 4/2001 | Verma | 370/236 |
| 6,434,620 B1 * | 8/2002 | Boucher et al. | 709/230 |
| 6,535,482 B1 * | 3/2003 | Hadi Salim et al. | 370/229 |
| 6,574,770 B1 * | 6/2003 | Daudelin | 714/776 |
| 6,625,118 B1 * | 9/2003 | Hadi Salim et al. | 370/229 |
| 2002/0080726 A1 * | 6/2002 | Klassen et al. | 370/252 |
| 2002/0159396 A1 * | 10/2002 | Carlson et al. | 370/252 |
| 2003/0031185 A1 * | 2/2003 | Kikuchi et al. | 370/400 |
| 2003/0214928 A1 * | 11/2003 | Chuah | 370/336 |
| 2004/0076190 A1 * | 4/2004 | Goel et al. | 370/516 |
| 2004/0122969 A1 * | 6/2004 | Ameigeiras et al. | 709/235 |
| 2005/0021832 A1 * | 1/2005 | Bennett et al. | 709/235 |

FOREIGN PATENT DOCUMENTS

EP    1 052 797    11/2000

OTHER PUBLICATIONS

"TCP: Transmission Control Protocol" Chapter 17. pp. 223-228.
"TCP Connection Establishment and Termination" Chapter 18. pp. 229-234.
"TCP Interactive Data Flow" Chapter 19. pp. 263-274.
"TCP Bulk Data Flow" Chapter 20. pp. 275-286.
"TCP Timeout and Retransmission" pp. 297-313.
Network Working Group Request for Comments: 1122 pp. 1-111.
Mark Allman, "On the Generation and Use of TCP Acknowledgements", XP-00091449, Oct. 1998, pp. 4-21.
Yukio Murayama et al., "A Proposal for a Solution of the TCP Short-Term Deadlock Problem", Jan. 1998, pp. 269-274.

* cited by examiner

*Primary Examiner*—Abdullahi Salad
(74) *Attorney, Agent, or Firm*—Squire, Sanders & Dempsey, LLP.

(57) ABSTRACT

According to the present invention the use of a delayed acknowledgment procedure of TCP in a communication network system arranged to transport TCP/IP packets is controlled. A burstiness of received TCP packets transmitted in the communication network system from an entity to a device is monitored and it is decided whether the monitored burstiness meets a predefined condition. On the basis of the decision result the delayed acknowledgment procedure is enabled or disabled.

37 Claims, 10 Drawing Sheets

ADAPTIVE DELAYED ACK SWITCHING FOR TCP APPLICATIONS

FIELD OF THE INVENTION

The present invention relates to controlling the use of a delayed acknowledgment procedure of TCP in a communication network system arranged to transport TCP/IP packets.

BACKGROUND OF THE INVENTION

TCP/IP (Transmission Control Protocol/Internet Protocol) is a network protocol used on LANs, WANs and the Internet. With the increasing amount of packet services on wireless systems, the use of TCP on a wireless system increases and in the near future it is believed that a considerable amount of the traffic on a wireless system is based on TCP/IP. Currently a major part of all Internet traffic is based on TCP/IP. Features of TCP/IP are described by Richard Stevens in TCP/IP Illustrated, vol. 1, Addison-Wesley, 1994, for example.

In TCP, data is split into what the protocol considers the optimum size chunks to transmit. The chunks are denominated segments and their size must not exceed a maximum constant value (Maximum Segment Size or MSS).

Figure 6:
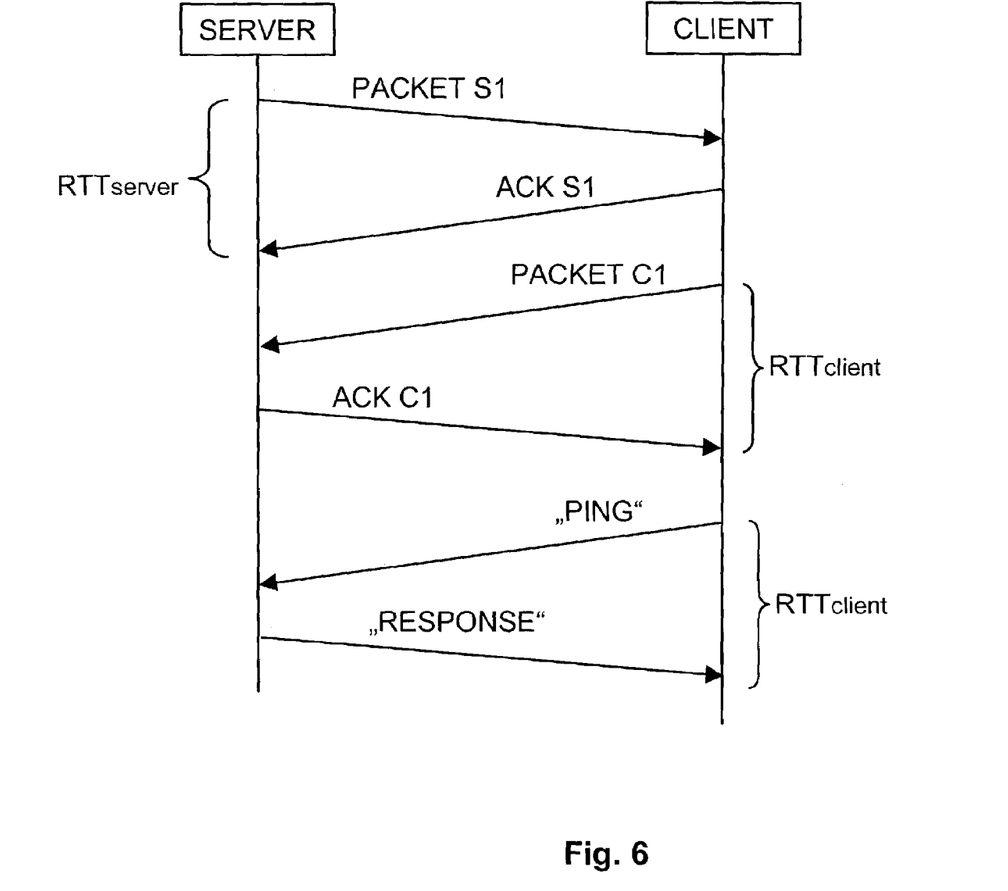
FIG. 6 shows a diagram illustrating round trip times (RTT).

Whenever a segment is transmitted by a server it has to reach a client which acknowledges the transmitted segment. The elapsed time when the server transmits the segment until it receives the corresponding acknowledgment is commonly known as Round Trip Time (RTT). This is shown in FIG. 6 for a segment or packet S1 transmitted from the server to the client and an acknowledgment ACK S1 transmitted from the client to the server. The TCP server holds a variable used to calculate an estimation of a maximum allowed RTT. This variable is called RTO. Moreover, the server has a timer that counts the elapsed time since the segment was transmitted. If the corresponding acknowledgment does not arrive at the server before the timer reaches the value of the RTO estimator, the server considers that congestion occurred in the network and starts congestion avoidance actions.

TCP tries to adapt the transmission rate to the load and capacity of the links of the network. This is done by several mechanisms, like slow start, retransmission timeout, fast retransmission, etc. Fast retransmission and retransmission timeout cause retransmission of TCP/IP packets, when they are lost or delayed more than a dynamic timer RTO.

The flow control in TCP is accomplished by means of two windows: the congestion window (cwnd) and the advertised window (awnd). For the problem treated here, it will be assumed that the congestion window is the minimum of both windows, and therefore cwnd will characterize the maximum amount of outstanding data that the server may transmit. The congestion window is controlled by slow start and congestion avoidance algorithms that try to optimize the amount of data injected to the load situation of the Internet.

The slow start algorithm is executed in the beginning of a connection (just after connection set-up) or after the occurrence of a timer expiration (time out).

Figure 1:
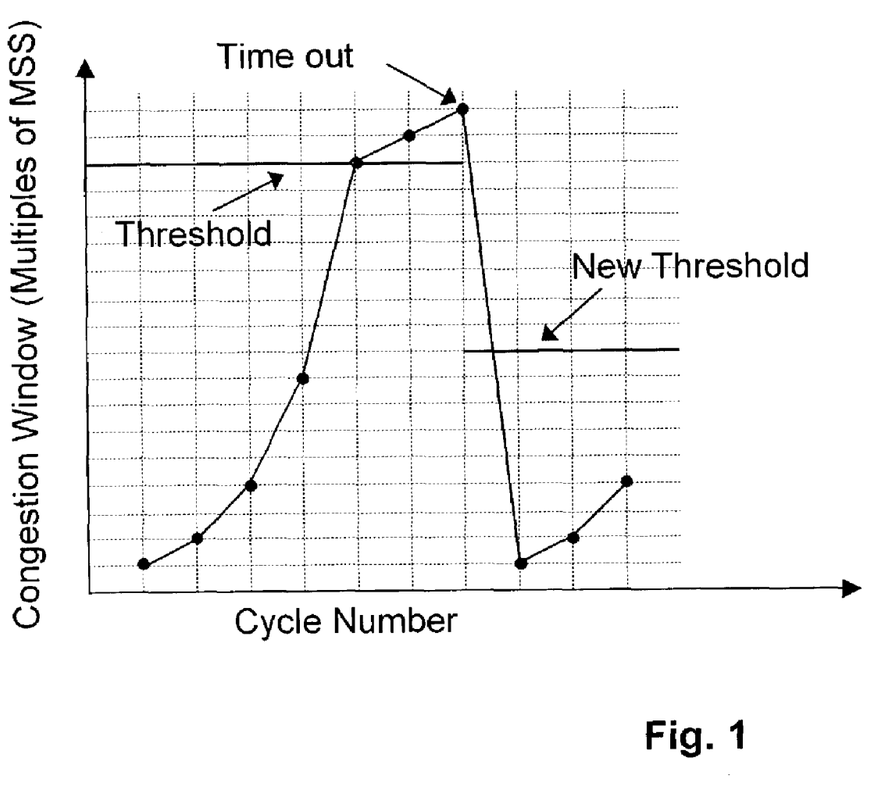
FIG. 1 shows a diagram illustrating congestion window evolution in slow start and congestion avoidance.

In FIG. 1 congestion window evolution in slow start and congestion avoidance is shown. During slow start, the congestion window is initialized to MSS bytes at the connection establishment (some implementations initialize it to two or four MSSs). After connection set-up the transmitting end passes to execute this algorithm. Each time a TCP acknowledgment is received at the server, the slow start increases the congestion window by MSS. So, when the first acknowledgment is received, the congestion window is increased from MSS to 2*MSS and two segments can be sent, and so on. FIG. 1 shows the exponential increase of the congestion window during slow start. When the cwnd exceeds the slow start threshold (e.g. initially set to 65535 bytes), the TCP transmitting entity (server) passes to execute the congestion avoidance algorithm. As it is illustrated in FIG. 1, when the congestion window reaches the slow start threshold it does not increase exponentially anymore but linearly.

Another different feature of TCP is denominated delayed acknowledgments. A host receiving a stream of TCP data segments can increase efficiency in both the Internet and the hosts by sending fewer than one ACK (acknowledgment) segment per data segment received. According to the Network Working Group, RFC 1122, this is known as a "delayed ACK". As expressed in this document, TCP should implement a delayed acknowledgment, but an acknowledgment should not be excessively delayed; in particular, the delay must be less than 0.5 seconds, and in a stream of full-sized segments there should be an acknowledgment for at least every second segment.

The delayed acknowledgment procedure has the obvious benefit that the uplink traffic in the RAN and in the fixed network decreases. But, on the other hand, it produces a slower increase of the congestion window since it decreases the arrival pace of acknowledgments at the server. This is not desired during slow start because it enlarges the required time for the congestion window to reach its optimum value. This larger time required by the congestion window to reach its optimum value is perceived by the final user as a delay, resulting in a worse end throughput. The effect of this delay is more pronounced in the download of small files (such as small web pages) than in the download of very large files (such as ftp).

Disabling the delayed acknowledgment procedure at the client during slow start would result in faster increase of the congestion window during slow start, and thus would increase the end throughput. However, if acknowledgments increase the traffic too fast, this might cause congestion in some part of the RAN (Radio Access Network), CN (Core Network) or the Internet.

There are TCP implementations that do not use the delayed acknowledgments in the beginning of the downloading. For example, an implementation might acknowledge 4 first packets immediately and use delayed acknowledgment thereafter.

However, those limits are fixed and they do not take into account, for example, that the allocated bit rate for the user might not be constant in a radio access network e.g. during downloading.

SUMMARY OF THE INVENTION

It is an object of the present invention to speed up a slow start of TCP by optimal usage of TCP delayed acknowledgment procedure.

According to the present invention, this object is achieved by a device for use in a network system that implements a delayed acknowledgement procedure of TCP, the network system including the device, a control method for controlling use of the delayed acknowledge procedure in the network system, and a computer program product having a computer program that when executed causes the network system to perform the steps of the control method.

The device includes a unit for receiving TCP packets, a unit for monitoring a burstiness of received TCP packets transmitted from an entity of a network system, a unit for deciding whether the monitored burstiness meets a predefined condition, and a control unit for disabling the delayed acknowledgment procedure or for enabling the delayed acknowledgment procedure on the basis of the decision result made by the deciding unit. The network system includes at least one device as described.

The control method includes the steps of monitoring a burstiness of received TCP packets transmitted in a network system from an entity to a device, deciding whether the monitored burstiness meets a predefined condition, and disabling the delayed acknowledgment procedure or enabling the delayed acknowledgment procedure on the basis of the decision result. The computer program product has a computer program that when executed causes the network system to perform the steps of the control method as described above.

The present invention offers a dynamical solution for the above-mentioned problem, reacting actively to traffic characteristics. According to the present invention, the utilization of the resources allocated in different links of a TCP connection (mainly in the limiting link) can be maximized without triggering any congestion situation in the nodes serving the mentioned links. Moreover, an end user throughput can be maximized by a faster growth of the cwnd during periods in which the cwnd is below its optimum value.

As a result, the user experiences less delay also during a slow start and higher end throughput or service, and on the other hand the TCP is still not aggressive or causing more congestion than conventional TCP implementations.

DESCRIPTION OF THE PRESENT INVENTION

An adaptive delayed acknowledgment (DA) control according to the present invention is based on the fact that in the beginning of a TCP downloading session TCP/IP segments arrive bursty at a receiver, for example due to a slow start of the TCP. The burstiness indicates that the downloading has not reached a stable state or constant flow, and therefore, a congestion window (cwnd) at a sender is not big enough. The optimum value of the cwnd is the one that maximizes the instantaneous throughput of the connection without triggering any congestion situation in the nodes serving the links utilized by the TCP connection. The faster the growth of the cwnd towards its optimum value, the smaller the initial period in which the TCP connection does not reach its maximum instantaneous throughput.

Figure 2:
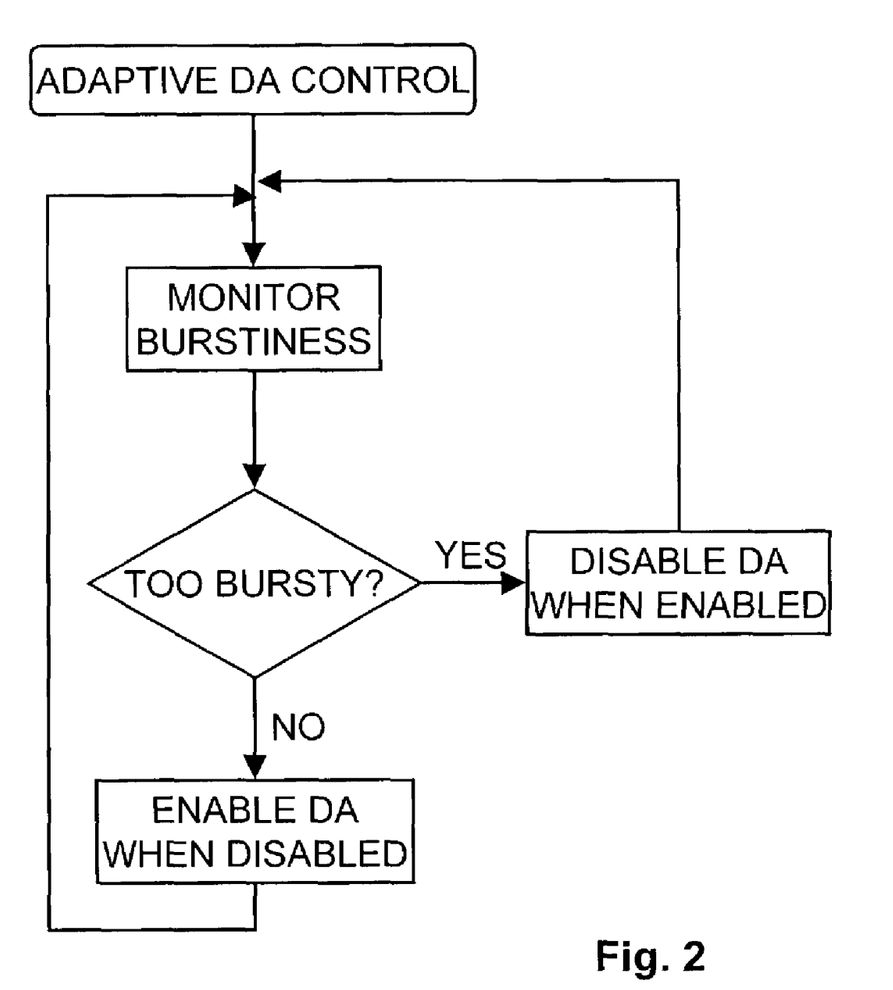
FIG. 2 shows a flow chart illustrating an adaptive delayed acknowledgment (DA) control according to the present invention.

FIG. 2 shows a flowchart illustrating the adaptive DA control according to the present invention. In the control process the burstiness of the received segments or packets is monitored. When it is decided that the burstiness exceeds a threshold the delayed acknowledgment procedure is disabled if it has been in an enabled state. On the other hand, if it is decided that the burstiness does not exceed the threshold anymore the delayed acknowledgment procedure is enabled again.

Figure 11:
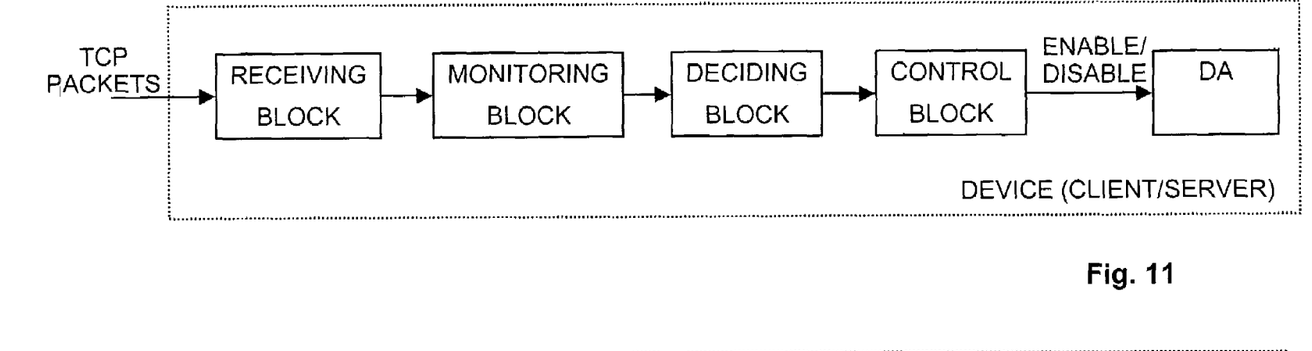
FIG. 11 shows a schematic block diagram of a device arranged to use a delayed acknowledgment procedure of TCP according to the present invention.

The adaptive DA control may be implemented in a device of a communication network system arranged to transport TCP/IP packets, in which the device is arranged to use a delayed acknowledgment procedure of TCP. The device or client as shown in FIG. 11 may comprise a unit for receiving TCP packets (receiving block), a unit for monitoring a burstiness of received TCP packets transmitted from an entity or a server of the communication network system (monitoring block), a unit for deciding whether the monitored burstiness meets a predefined condition (deciding block), and a control unit (control block) for disabling the delayed acknowledgment procedure or for enabling the delayed acknowledgment procedure on the basis of the decision result. In a mobile network the client is a terminal. However, it is to be noted that the DA control implementation is not restricted to a physical device or a client. Rather, the DA control may be implemented in any physical, logical or software element that is an element capable of performing TCP. The node where the element capable of performing TCP is located may be, for example, a mobile terminal, a laptop connected to a mobile terminal, a network element like an Internet, Intranet, proxy or mail server, a computer, etc. Hence, the term "client" used herein should be assumed to cover all the above possibilities.

Figure 12:
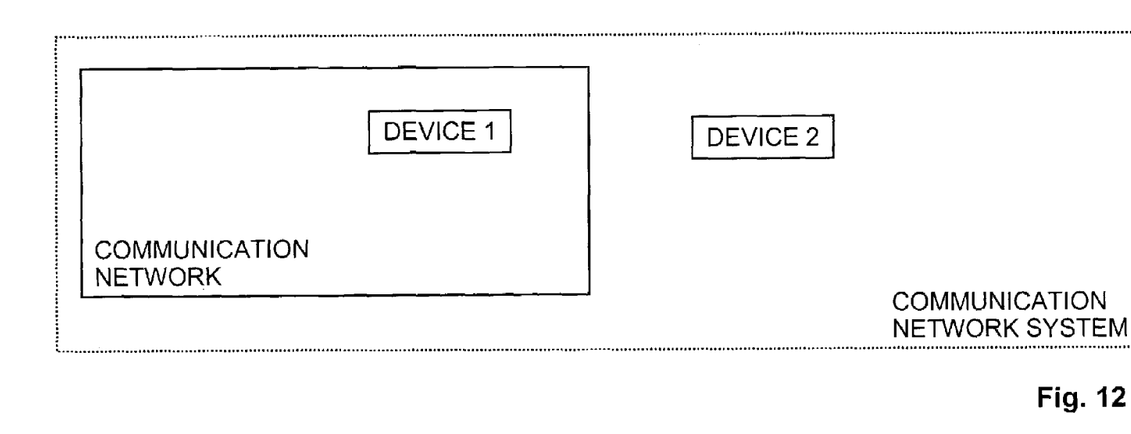
FIG. 12 shows a schematic block diagram of a communication network system according to an embodiment of the present invention.

FIG. 12 shows a schematic block diagram of a communication network system arranged to transport TCP/IP packets which may comprise a device as shown in FIG. 11. According to the embodiment shown in FIG. 12, the network system may comprise a device 1 corresponding to the device of FIG. 11, which is located in a communication network being part of the communication network system. Moreover, the communication network system may comprise a device 2 corresponding to the device of FIG. 11 which is not part of the communication network itself.

The burstiness of the arrival of the TCP segments may be deduced from an interarrival time of received TCP segments measured by the client. Moreover, interarrival time statistics may be computed by the client. On the basis of the interarrival times it is possible to decide, when the delayed acknowledgment should be optimal to use.

In other words, on the basis of the measured interarrival time the client identifies when the TCP server is running a slow start algorithm or a situation in which the congestion window is low (compared to its optimum value). When the client identifies such situation, the client can disable the delayed acknowledgment procedure. When the client does not encounter the situation anymore, the client enables the delayed acknowledgment procedure again.

Moreover, the client may identify the above-mentioned situation on the basis of the statistics of the interarrival time between segments at the client.

In addition, the client may identify the slow start situation or the situation in which the congestion window is low by taking into account RTT (Round Trip Time) information. This information is available at the client if it transmits data to the server. According to FIG. 6 the client transmits a packet C1 to the server and after a time period receives an acknowledgment ACK C1 from the server. The time elapsed from sending the packet C1 to receiving the ACK C1 at the client is the round trip time RTT. If the client does not transmit data to the server, the information could be gained by pinging the server.

According to FIG. 6, in this case the RTT is determined from the sending of a ping message to the server to receiving a response to the ping message from the server.

It is to be noted that a conservative approach is preferred in the actual implementation of the present invention rather than an aggressive one. The reason is to avoid the risk of inducing congestion in the Internet, the core network or the RAN.

For example, the following process using interarrival time statistics can be used to detect the slow start situation or the situation in which the congestion window is low. The slow start situation is not only present after a connection establishment but is also caused by timer expirations.

Figure 3:
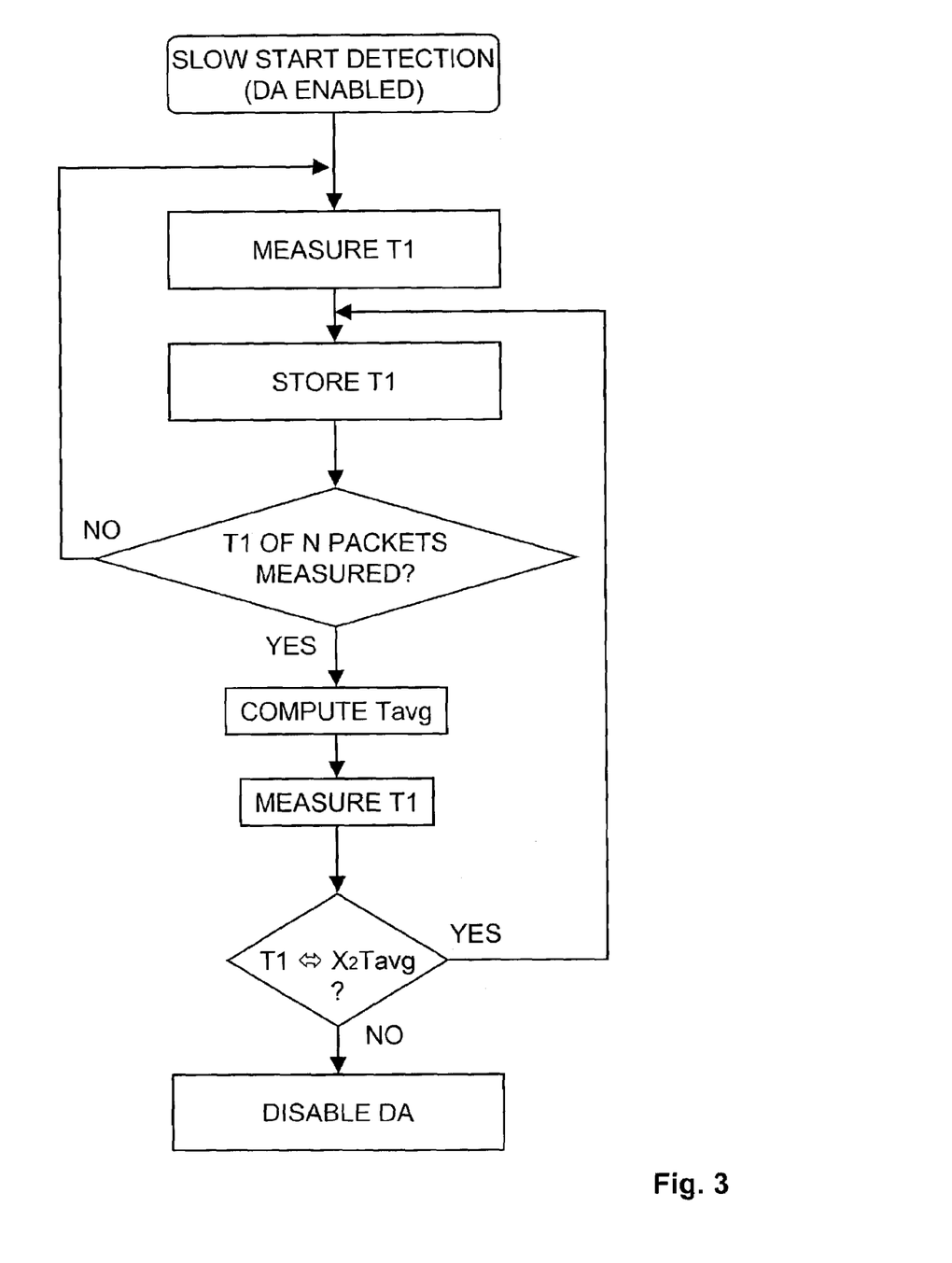
FIG. 3 shows a flow chart illustrating a slow start detection according to the present invention.

For disabling the delayed acknowledgment procedure after a timer expiration, the client may comprise a timer that measures an interarrival time between consecutive packets received at the client as can be seen from FIG. 3. This time is stored in a variable $T_1$. From the last N packets an average interarrival time $T_{avg}$ is computed. Then a newly measured interarrival time $T_1$ is compared with the term $X_2 * T_{avg}$, $X_2$ being an adjustable parameter. In case the comparison fulfills $T_1 \leq X_2 * T_{avg}$, the averaging and comparing process is repeated. On the other hand, in case the comparison does not fulfill $T_1 \leq X_2 * T_{avg}$, it is assumed that the slow start situation is present and, as a result, the delayed acknowledgment procedure is disabled.

In case the slow start situation has been detected using the above described process or in case of a connection establishment the delayed acknowledgment procedure is set to a disabled state. In this condition, for example, the following processes can be used to identify whether the slow start situation is not present anymore but the congestion window is below its optimum value, depending on whether the client has knowledge of a round trip time (RTT) or not.

Figure 4:
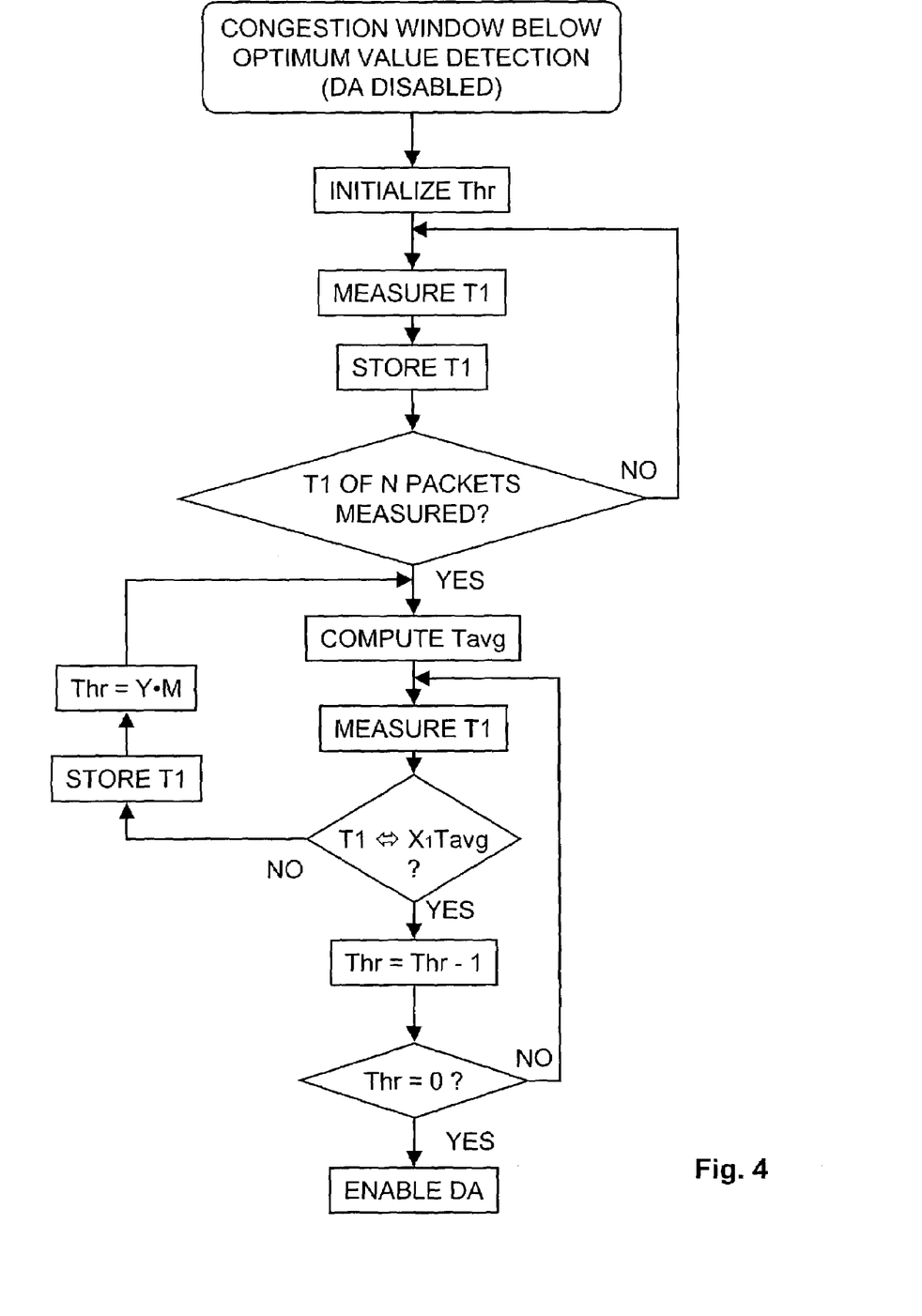
FIG. 4 shows a flow chart illustrating a process for detecting that a congestion window is below its optimum value according to the present invention.

For example, a process for detecting that the congestion window is below its optimum value based on measured interarrival time statistics is shown in FIG. 4.

For performing the process the client may have a decreasing counter. The counter is initialized to a certain value $T_{hr}$. The client may also have a timer that measures the interarrival time between consecutive packets. This time is stored in a variable $T_1$. According to the process shown in FIG. 4, an average interarrival time between packets $T_{avg}$ of the last N packets is computed. Then a currently measured interarrival time $T_1$ is compared with $X_1 * T_{avg}$. If the comparison fulfills:

$$T_1 \leq X_1 * T_{avg} \quad (1)$$

for a certain adjustable parameter $X_1$, then the counter is decreased. It is to be noted that, if the current value $T_1$ fulfills the mentioned condition, then it should not be considered for the following averaging. While the counter is larger than zero, the delayed acknowledgment procedure remains disabled. When the counter reaches the value zero, the delayed acknowledgments are enabled again.

If the condition (1) is not fulfilled, then the counter $T_{hr}$ may be reset to a threshold, and the counter decreasing process starts again. Due to the variety of RTT and link bit rates possibly encountered by the TCP connection, the threshold employed to reset the counter should be adaptive.

According to the present invention, the threshold can be adaptively selected in the following way:

$$T_{hr} = Y * M \quad (2)$$

where Y is an adjustable parameter which may take into account the variety of RTT and link bit rates, and M is the number of packets received by the client in between the last two times that condition (1) was not fulfilled. Hence, the client may comprise means for registering a link bit rate of the TCP connection and means for registering a round trip time of the TCP connection.

Possible values of the parameters are given in next table:

| Initial $T_{hr}$ | $X_1$ | N | Y |
|---|---|---|---|
| 4 | 3 | 5 | 3 |

Figure 7:
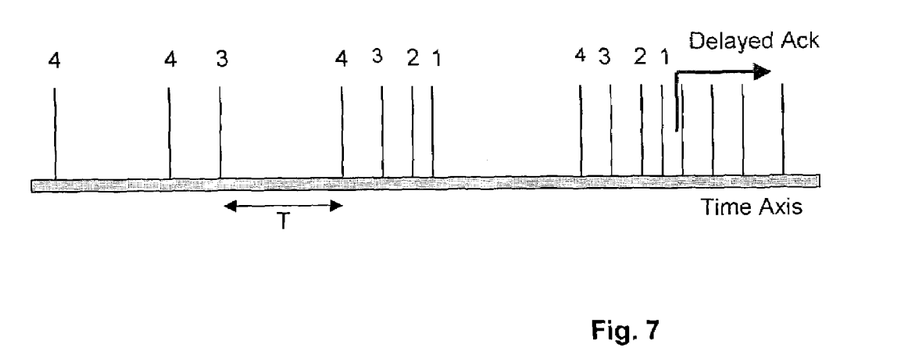
FIG. 7 shows a time chart according to the process illustrated in FIG. 4.

FIG. 7 shows a time chart according to the above-described process. The figure depicts the arrival of segments at the client. The counter is decreased whenever the condition (1) is fulfilled. If the condition is not fulfilled (due to a large gap in the reception of segments) the counter is reset again according to equation (2). When the counter reaches the value zero, the delayed acknowledgment procedure is finally enabled.

Figure 5:
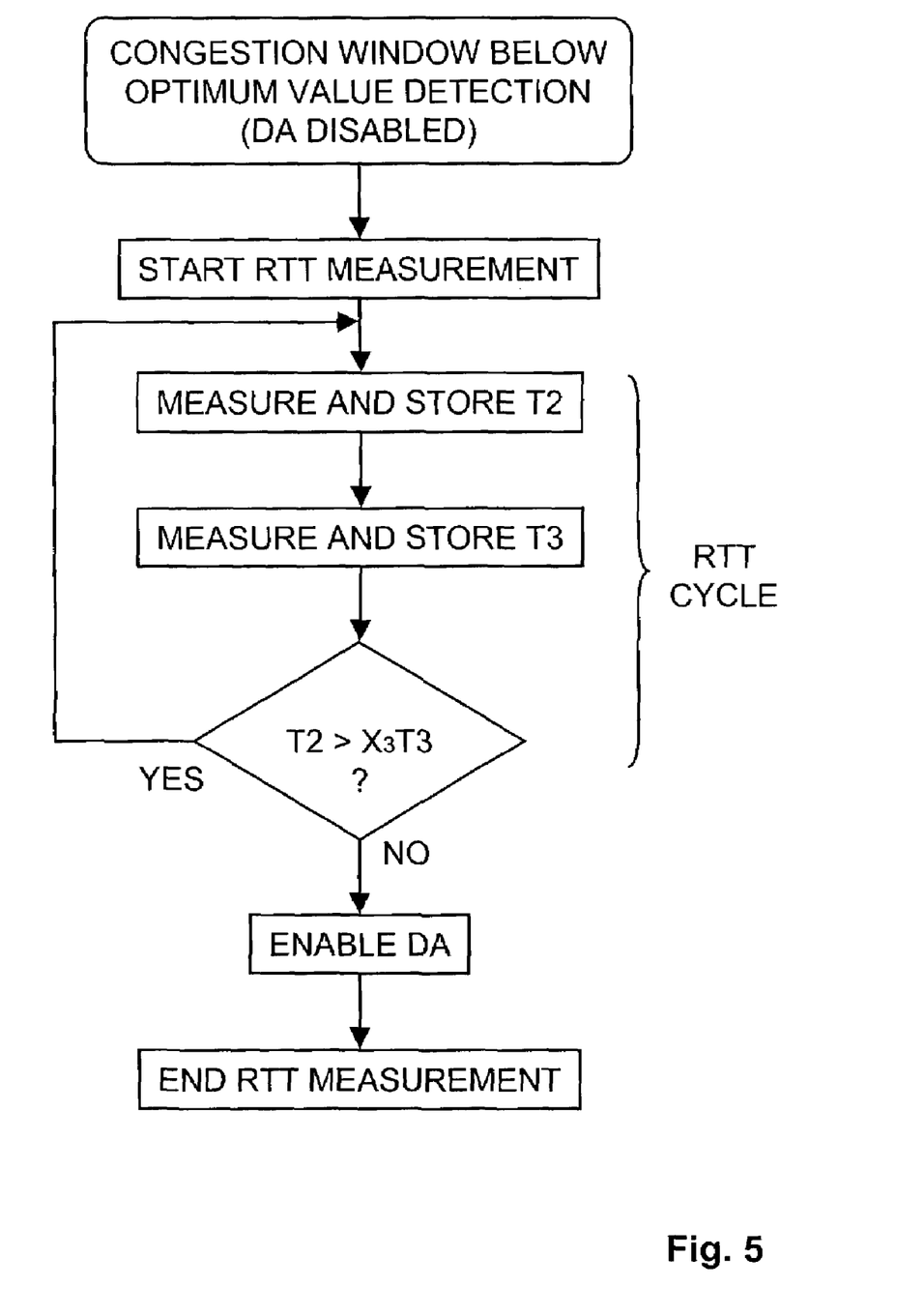
FIG. 5 shows a flow chart illustrating another process for detecting that a congestion window is below its optimum value according to the present invention.

FIG. 5 shows another example of a process for detecting that the congestion window is below its optimum value based on measured interarrival times and a round trip time cycle.

According to this process the client may comprise a timer that measures the interarrival time between consecutive packets and means for measuring a round trip time (RTT) cycle. According to the process and as can be seen form FIG. 5, the largest ($T_2$) and the second largest ($T_3$) interarrival time between packets in every RTT cycle are measured and stored. Then, at the end of the RTT cycle the following comparison is carried out:

$$T_2 > X_3 * T_3 \quad (3)$$

for a certain adjustable parameter $X_3$. If the condition is fulfilled, then for the following cycle the delayed acknowledgment procedure remains disabled. If in a certain cycle the comparison is fulfilled, then the delayed acknowledgments are enabled since then on. Note that after the delayed acknowledgments are enabled a server pinging may not be needed anymore and the RTT measurement may be terminated. A possible value of $X_3$ is 3.

Figure 8:
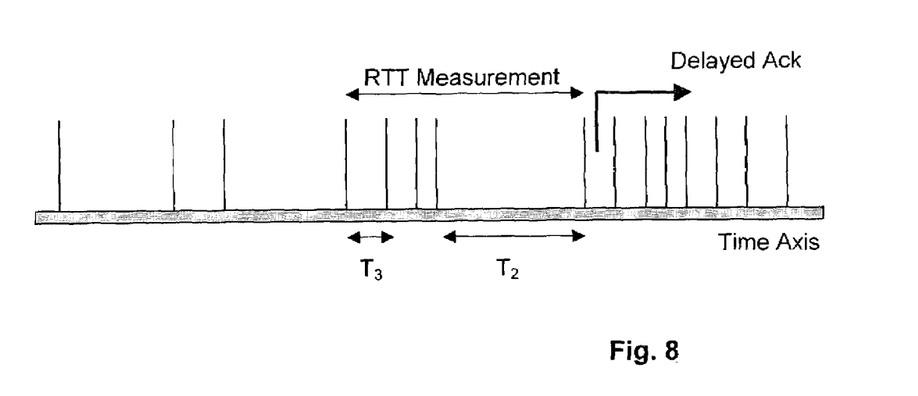
FIG. 8 shows a time chart according to the process illustrated in FIG. 5.

FIG. 8 shows a time chart according to the above-described process. The figure depicts the arrival of segments at the client. In every RTT cycle the two maximum interarrival times between packets are measured and stored. At the end of the cycle, if condition (3) is fulfilled, the delayed acknowledgment procedure is enabled again.

After having set the delayed acknowledgment procedure in the enabled state again, the process according to FIG. 3 may be executed again in which the parameter $X_2$ may have a more conservative value than $X_1$ or $X_3$, i.e. $X_2 \geq X_1$ or $X_2 \geq X_3$.

Moreover, for detecting the slow start situation a process similar to that shown in FIG. 5 can be executed. In this process a slow start situation could be detected when the delayed acknowledgment procedure is enabled and the condition $T_2 > X_4 * T_3$ is fulfilled with $T_2$ being the largest interarrival time, $T_3$ being the second largest interarrival time and $X_4$ being an adjustable parameter meeting the condition $X_4 \geq X_1$ or $X_4 \geq X_3$. In this case the RTT measurements may be continued during the whole download.

Regarding the selection of the $X_1$ and $X_3$ values, they should be selected large enough so that the interarrival time between packets of the same slow start cycle fulfill condition (1) or (3). In addition, they should be selected small enough so that time between consecutive packets of different cycles does not fulfill those conditions. Similar criteria can be used for $X_2$ and $X_4$ which should be more conservative than $X_1$ and $X_3$.

Moreover, according to the present invention, the initial threshold $T_{hr}$ and the Y parameter may either be constant or adaptive. The value of the threshold depends on the bandwidth of the limiting link and the total round trip time. If their product is large, then the threshold should be large, and vice versa. One possible solution to make the threshold adaptive is to let it grow in every cycle. For example, Y may be something between 2 and 2.5 (or even higher). If in one cycle M=2 packets were received, then in the next cycle $T_{hr}$ would be equal to 5. That would imply that if more than five packets arrived fulfilling condition (1), the link would have reached the condition to enable DA. If only four packets arrived fulfilling condition (1), meaning that the limiting link was not fully utilized, then, after condition 1 was not fulfilled, $T_{hr}$ would be re-computed multiplying M=4 by Y, and DA would remain disabled.

Figure 9:
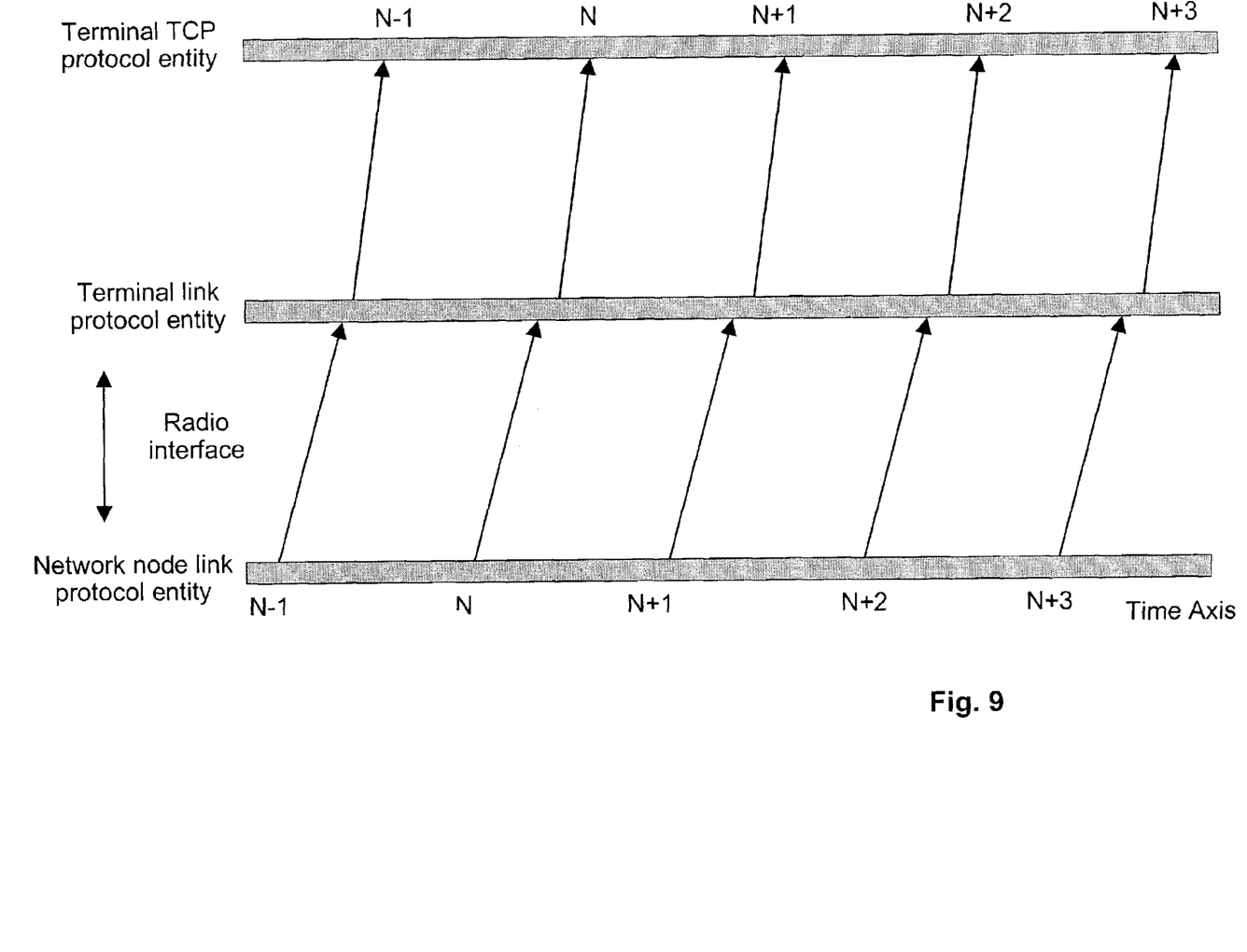
FIG. 9 shows a time chart illustrating data blocks of a link protocol sent over an air interface.

The client may take into account the knowledge of the used transport media when it decides which method and which parameters should be used for enabling and disabling the delayed acknowledgment procedure. Especially in a mobile environment an error correction algorithm on a radio link may cause itself bursty arrival, effects on delayed acknowledgment algorithms of which can be minimized by a proper parametrisation. For example, FIG. 9 shows data blocks N−1 to N+3 of a link protocol that are sent over an air interface with a constant interval. There are three protocol entities: a network node link protocol entity, its peer at the terminal end, and TCP at the terminal. An example of the link protocol is RLC (Radio Link Control) in UTRAN (UMTS Terrestrial Radio Access Network). For simplicity it is assumed here that a link protocol block contains a single, whole TCP/IP packet. So, the link layer protocol transmits its transmission blocks to the mobile end. All the blocks are correct, and they are forwarded to TCP layer, after they have been processed at the receiver end of the link protocol.

Figure 10:
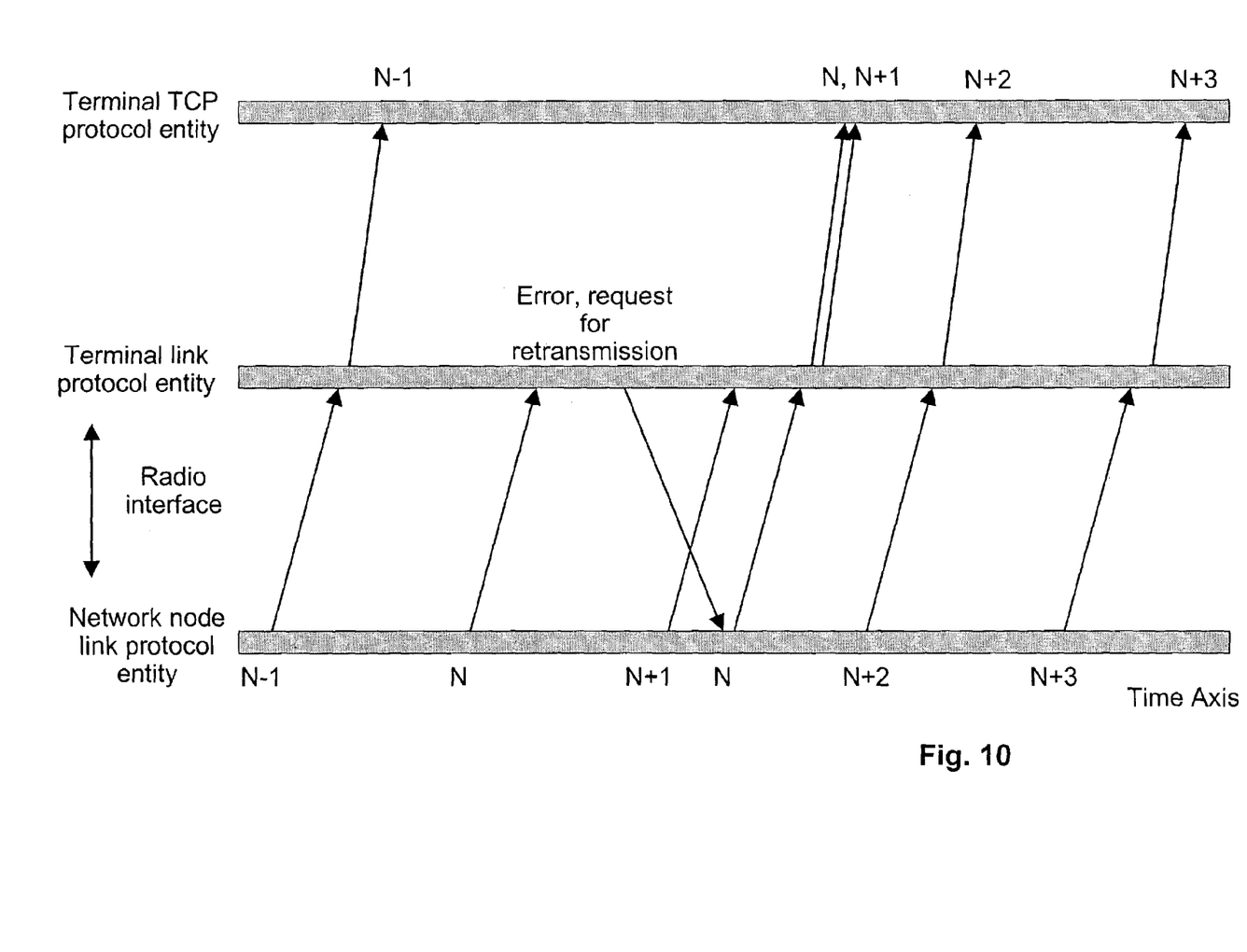
FIG. 10 shows the time chart of FIG. 9 with an error in block N.

Now, the air interface generates typically some errors, and it is link layer protocol's duty to try to correct them. As shown in FIG. 10, the block number N is erroneous, and this is detected by the link layer protocol. It requests for retransmission of the Nth block. The transmission of N+1th block succeeds fine, but the link layer protocol may typically be in an in-sequence mode meaning that the upper layer packets are given in-sequence to the upper layer at the receiving end of the link protocol. This means that the N+1th packet waits until the Nth packet is retransmitted (or the maximum number of retransmissions have been performed unsuccessfully). The TCP layer experiences two packets arriving about simultaneously, i.e. within 2 to 10 ms.

Therefore, in case multiple packets arrive "simultaneously", according to the present invention, the average interarrival time may be calculated again taking into account chunk of newly arrived packets, and the triggering ($X_1$, $X_2$, etc.) may be changed into a more conservative direction, as predictability has decreased. This effect is not due to TCP behavior, but radio link behavior.

In a more robust embodiment of the invention, the possibility of misbehavior (client deduces something wrong) can be minimized by some different implementation. For example, only enabling the DA for the beginning of the session may be implemented, and/or the enabling may be performed when a predefined number of packets has arrived within a certain time period. A more robust embodiment for disabling may be the following: if the interarrival time between two packets is longer than a predefined time period, e.g. 2 seconds, then the DA is disabled.

The adaptive delayed acknowledgments control according to the present invention can be used in addition to conventional TCP implementations that do not use the delayed acknowledgments in the beginning of the downloading.

It is to be understood that the above description is illustrative of the invention and is not to be construed as limiting the invention. Various modifications and applications may occur to those skilled in the art without departing from the true spirit and scope of the invention as defined by the appended claims.

What is claimed is:

1. A device, comprising:
a receiver unit configured to receive transmission control protocol packets;
a monitor unit configured to monitor a burstiness of received transmission control protocol packets transmitted from an entity of a communication network system configured to transport transmission control protocol/internet protocol packets;
a decision unit configured to decide whether the monitored burstiness meets a predefined condition; and
a control unit configured to disable a delayed acknowledgment procedure of transmission control protocol or enable the delayed acknowledgment procedure based on a decision result made by the decision unit,
wherein the monitor unit comprises a measurement unit configured to measure an interarrival time of the received transmission control protocol packets for calculating the burstiness therefrom,
wherein the measurement unit is configured to measure consecutive interarrival times, and the monitor unit further comprises a computation unit configured to compute an average interarrival time $T_{avg}$ from the measured interarrival times for calculating the burstiness therefrom,
wherein the monitor unit further comprises an initialization unit configured to initialize a counter $T_{hr}$ when the delayed acknowledgment procedure is in a disabled state and configured to decrement the counter when the condition $T_1 \leq X_1 * T_{avg}$ is met, with $T_1$ being the currently measured interarrival time, $T_{avg}$ being the average interarrival time of preceding N packets, and $X_1$ being an adjustable parameter, and wherein the decision unit is configured to decide that the burstiness is low when the condition $T_{hr}=0$ is met, and as a result the delayed acknowledgment procedure is enabled by the control unit.

2. The device according to claim 1, wherein devices is configured not to use the currently measured interarrival time $T_1$ for a following average interarrival time computation when the condition $T_1 \leq X_1 * T_{avg}$ is met.

3. The device according to claim 1, wherein the monitor unit further comprises a reset unit configured to reset the counter $T_{hr}$ when the condition $T_1 \leq X_1 * T_{avg}$ is not met and $T_{hr} > 0$.

4. The device according to claim 3, wherein the reset unit is configured to reset the counter $T_{hr}$ to a threshold $T_{hr} = Y*M$ with Y being an adjustable parameter and M being the number of packets received in between the last two times the condition $T_1 \leq X_1 * T_{avg}$ was not met.

5. The device according to claim 4, further comprising:
a register unit configured to register a link bit rate of the transmission control protocol connection, wherein the reset unit is configured to adjust the parameter Y based on the registered link bit rate.

6. The device according to claim 4, further comprising:
a register unit configured to register a round trip time of the transmission control protocol connection, wherein the reset unit is configured to adjust the parameter Y based on the registered round trip time.

7. The device according to claim 1, wherein the decision unit is configured to decide that the burstiness is high when the condition $T_1 > X_2 * T_{avg}$ is met and when the delayed acknowledgment procedure is in an enabled state, with $T_1$ being the currently measured interarrival time, $T_{avg}$ being the average interarrival time of preceding N packets, and $X_2$ being an adjustable parameter, and as a result the delayed acknowledgement procedure is disabled by the control unit.

8. The device according to claim 1, wherein the control unit is configured to disable the delayed acknowledgment procedure at the beginning of a connection establishment between the entity and the device.

9. The device according to claim 1, wherein the monitor unit further comprises a measurement unit configured to measure a round trip time cycle and a determination unit configured to determine the largest interarrival time $T_2$ and the second largest interarrival time $T_3$ out of the measured interarrival times during one round trip time cycle, and wherein the decision unit is configured to decide that the burstiness is high when the condition $X_4 * T_3 < T_2$ is not met, with $X_4$ being an adjustable parameter, and as a result the delayed acknowledgement procedure is disabled by the control unit when it has been in an enabled state.

10. A device, comprising:
a receiver unit configured to receive transmission control protocol packets;
a monitor unit configured to monitor a burstiness of received transmission control protocol packets transmitted from an entity of a communication network system configured to transport transmission control protocol/internet protocol packets;
a decision unit configured to decide whether the monitored burstiness meets a predefined condition; and
a control unit configured to disable a delayed acknowledgment procedure of transmission control protocol or enable the delayed acknowledgment procedure based on a decision result made by the decision unit,
wherein the monitor unit comprises a measurement unit configured to measure an interarrival time of the received transmission control protocol packets for calculating the burstiness therefrom,
wherein the measurement unit is configured to measure consecutive interarrival times, and the monitor unit further comprises a measurement unit configured to measure a round trip time cycle for calculating the burstiness from the measured interarrival times and the round trip time cycle,
wherein the monitor unit further comprises a determination unit configured to determine the largest interarrival time $T_2$ and the second largest interarrival time $T_3$ out of the measured interarrival times during one round trip time cycle, and wherein the decision unit is configured to decide that the burstiness is low when the condition $X_3 * T_3 < T_2$ is met, with $X_3$ being an adjustable parameter, and as a result the delayed acknowledgment procedure is enabled by the control unit when it has been in a disabled state.

11. The device according to claim 10, wherein the determination unit is not configured to determine the round trip time cycle when the delayed acknowledgment procedure is in the enabled state.

12. The device according to claim 10, wherein the determination unit is configured to determine the round trip time cycle from an elapsed time from the transmittal of a data packet to the entity to the receipt of a corresponding acknowledgment at the device.

13. The device according to claim 10, wherein the determination unit is configured to determine the round trip time cycle from an elapsed time from the transmittal of a message requiring response to the entity to the receipt of the response at the device.

14. The device according to claim 10, wherein the decision unit is configured to decide that the burstiness is high when the condition $X_4 * T_3 < T_2$ is not met, with $X_4$ being an adjustable parameter, and as a result the delayed acknowledgment procedure is disabled by the control unit when it has been in an enabled state.

15. The device according to claim 10, wherein the monitor unit further comprises a computation unit configured to compute an average interarrival time $T_{avg}$ from the measured interarrival times, wherein the decision unit is configured to decide that the burstiness is high when the condition $T_1 > X_2 * T_{avg}$ is met and when the delayed acknowledgment procedure is in an enabled state, with $T_1$ being the currently measured interarrival time, $T_{avg}$ being the average interarrival time of preceding N packets and $X_2$ being an adjustable parameter, and as a result the delayed acknowledgment procedure is disabled by the control unit.

16. The device according to claim 10, wherein the control unit is configured to disable the delayed acknowledgment procedure at the beginning of a connection establishment between the entity and the device.

17. The device according to claim 1 or 10, wherein the device is a client.

18. The device according to claim 1 or 10, wherein the device is a server.

19. The device according to claim 1 or 10, wherein the device is a terminal of a mobile communication network.

20. A communication network system comprising the device according to any one of claims 1, 2 to 9, or 10 to 19.

21. A method, comprising:
monitoring a burstiness of received transmission control protocol packets transmitted in a communication network system configured to transport transmission control protocol/internet protocol packets, from an entity to a device;
deciding whether the monitored burstiness meets a predefined condition;

disabling the delayed acknowledgment procedure or enabling the delayed acknowledgment procedure based on a result of the deciding;

measuring consecutive interarrival times of the received transmission control protocol packets;

computing an average interarrival time $T_{avg}$ from the measured interarrival times;

calculating the burstiness therefrom;

initializing a counter $T_{hr}$ when the delayed acknowledgment procedure is in a disabled state;

decrementing the counter when the condition $T_1 \leq X_1 * T_{avg}$ is met, with $T_1$ being the currently measured interarrival time, $T_{avg}$ being the average interarrival time of preceding N packets and $X_1$ being an adjustable parameter;

deciding that the burstiness is low when the condition $T_{hr}=0$ is met; and as a result, enabling the delayed acknowledgment procedure.

22. The method according to claim 21, further comprising:

omitting using the currently measured interarrival time $T_1$ for a following average interarrival time computation when the condition $T_1 \leq X_1 * T_{avg}$ is met.

23. The method according to claim 21, further comprising:

resetting the counter $T_{hr}$ when the condition $T_1 \leq X_1 * T_{avg}$ is not met and $T_{hr>}0$.

24. The method according to claim 23, further comprising:

resetting the counter $T_{hr}$ to a threshold $T_{hr}=Y*M$ with Y being an adjustable parameter and M being the number of packets received in between the last two times the condition $T_1 \leq X_1 * T_{avg}$ was not met.

25. The method according to claim 24, further comprising:

registering a link bit rate of the transmission control protocol connection; and adjusting the parameter Y based on the registered link bit rate.

26. The method according to claim 24, further comprising:

registering a round trip time of the transmission control protocol connection; and adjusting the parameter Y based on the registered round trip time.

27. The method according to claim 21, further comprising:

deciding that the burstiness is high when the condition $T_1 > X_2 * T_{avg}$ is met and when the delayed acknowledgment procedure is in an enabled state, with $T_1$ being the currently measured interarrival time, $T_{avg}$ being the average interarrival time of preceding N packets, and $X_2$ being an adjustable parameter; and as a result, disabling the delayed acknowledgment procedure.

28. The method according to claim 21, further comprising:

disabling the delayed acknowledgment procedure at the beginning of a connection establishment between the entity and the device.

29. The method according to claim 21, further comprising:

measuring a round trip time cycle;

measuring the largest interarrival time $T_2$ and the second largest interarrival time $T_3$ out of the measured interarrival times during one round trip time cycle;

deciding that the burstiness is high when the condition $X_4 * T_3 < T_2$ is not met, with $X_4$ being an adjustable parameter; and as a result, disabling the delayed acknowledgment procedure when it has been in an enabled state.

30. A method, comprising:

monitoring a burstiness of received transmission control protocol packets transmitted in a communication network system configured to transport transmission control protocol/internet protocol packets, from an entity to a device;

deciding whether the monitored burstiness meets a predefined condition;

disabling the delayed acknowledgment procedure or enabling the delayed acknowledgment procedure based on a result of the deciding;

measuring consecutive interarrival times of the received transmission control protocol packets measuring a round trip time cycle;

calculating the burstiness from the measured interarrival times and the round trip time cycle;

determining the largest interarrival time $T_2$ and the second largest interarrival time $T_3$ out of the measured interarrival times during one cycle;

deciding that the burstiness is low when the condition $X_3 * T_3 < T_2$ is met, with $X_3$ being an adjustable parameter; and as a result, enabling the delayed acknowledgment procedure when it has been in the disabled state.

31. The method according to claim 30, further comprising:

omitting determining the round trip time cycle when the delayed acknowledgment procedure is in the enabled state.

32. The method according to claim 30, further comprising:

determining the round trip time cycle from an elapsed time from the transmittal of a data packet to the entity to the receipt of a corresponding acknowledgment at the device.

33. The method according to claim 30, further comprising:

determining the round trip time cycle from an elapsed time from the transmittal of a message requiring response to the entity to the receipt of the response at the device.

34. The method according to claim 30, further comprising:

deciding that the burstiness is high when the condition $X_4 * T_3 < T_2$ is not met, with $X_4$ being an adjustable parameter; and as a result, disabling the delayed acknowledgment procedure when it has been in an enabled state.

35. The method according to claim 30, further comprising:

computing an average interarrival time $T_{avg}$ from the measured interarrival times;

deciding that the burstiness is high when the condition $T_1 > X_2 * T_{avg}$ is met and when the delayed acknowledgment procedure is in an enabled state, with $T_1$ being the currently measured interarrival time, $T_{avg}$ being the average interarrival time of preceding N packets and $X_2$ being an adjustable parameter; and as a result, disabling the delayed acknowledgment procedure.

36. The method according to claim 30, further comprising:

disabling the delayed acknowledgment procedure at the beginning of a connection establishment between the entity and the device.

37. A computer program product embodied on a computer readable medium comprising processor implementable instructions for controlling a processor to carry out the method according to any one of claims 21, 22-29, or 30 to 36.

* * * * *